Patented Oct. 27, 1936

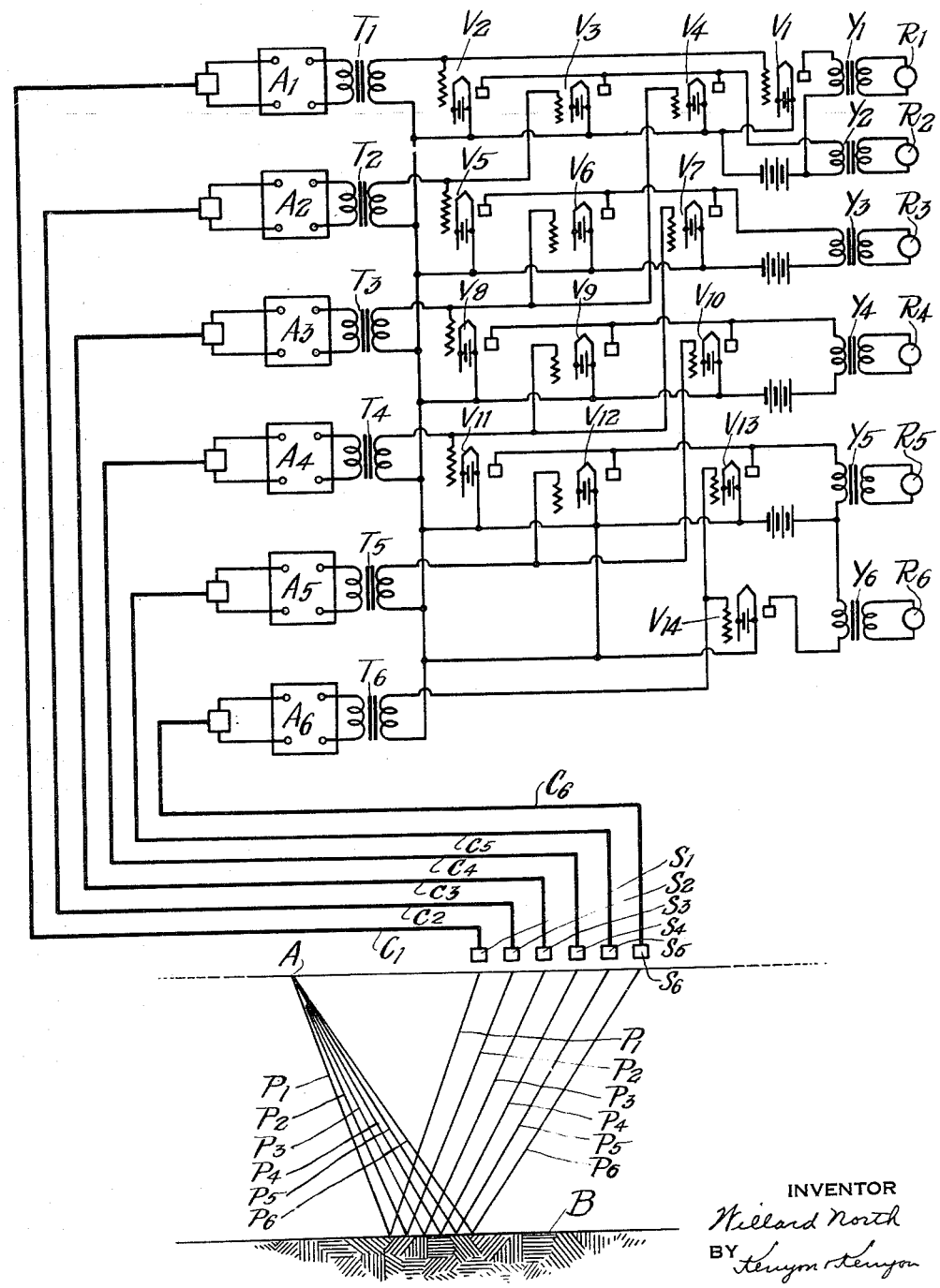

2,059,018

UNITED STATES PATENT OFFICE 2,059,018

SUB-SURFACE SURVEYING

Willard North, Los Banos, Calif., assignor to Geophysical Research Corporation, New York, N. Y., a corporation of New Jersey Application August 30, 1934, Serial No. 742,111

23 Claims. (Cl. 181—0.5)

This invention relates to the surveying of subsurface formations by the use of artificial seismic waves.

In one method of such surveying, artificial seismic waves are produced substantially at the earth's surface through the medium of a disturbance of the earth effected by the detonation of a charge of explosive or by other suitable means. Appropriate receiving, timing and recording apparatus is placed at some distance from the wave source and a record is made of the waves arriving at the receiving point. From this record, the time required for a wave to travel from the source down to a sub-surface horizon and back to the surface after reflection is determined.

The records of reflected waves are often obscured by reason of waves arriving at the receiving point over direct paths and also by reason of waves due to local disturbances. It has already been proposed to improve the recording of reflected waves by the use of a series of detectors, differently spaced from the wave source and to impress the outputs of such detectors upon a single recorder, thus producing a composite record in which the amplitude of the reflected waves is greater and the amplitude of the direct waves is less than the corresponding amplitude in a record made with only a single detector. The use of a plurality of detectors in this manner also reduces the obscuring effect of local disturbances. This procedure, while helpful, involves the use of a large amount of equipment. Ordinarily, it is customary to make from four to six records of each earth disturbance and it is desirable to use at least three detectors for each recorder in the production of a composite record.

The present invention has for its object to avoid the practical difficulties inherent in prior practice by using at least as many detectors as recorders to obtain one or more composite records and also comparison records showing the response of a single detector.

According to this invention, each detector is connected to more than one recorder and one or more recorders is connected to a plurality of detectors. Thus, one or more recorders has impressed upon it the combined outputs of several detectors so that composite records of the waves received by the several detectors are obtained. Relative spacing of the detectors from the wave source is such that the effects of the direct waves tend to counteract each other, when combined, and the effects of the reflected waves are augmented. Any desired number of detectors and recorders may be used in the practice of this invention and different numbers of detectors may be connected to the several recorders.

Other objects, novel features and advantages of this invention will be apparent from the following specification and accompanying drawing, wherein the single figure is diagrammatically illustrative of a form of the invention.

The wave source is designated A and B designates a reflecting discontinuity. Wave detectors $S_1$, $S_2$, $S_3$, $S_4$, $S_5$, and $S_6$ are arranged in the earth near its surface along a line passing through the point A and are spaced apart from each other approximately 100 feet, it being understood that this spacing may be varied to meet different conditions. Two-wire cables $C_1$, $C_2$, $C_3$, $C_4$, $C_5$ and $C_6$ lead from the detectors $S_1$, $S_2$, $S_3$, $S_4$, $S_5$ and $S_6$ to the amplifiers $A_1$, $A_2$, $A_3$, $A_4$, $A_5$ and $A_6$ respectively. The output circuits of the amplifiers $A_1$, $A_2$, $A_3$, $A_4$, $A_5$ and $A_6$ include the primaries of transformers $T_1$, $T_2$, $T_3$, $T_4$, $T_5$ and $T_6$.

The secondary of the transformer $T_1$ is included in the input circuit of the vacuum tube $V_1$, the output circuit of which is connected through the transformer $Y_1$ with the recorder $R_1$. The secondaries of the transformer $T_1$, $T_2$ and $T_3$ are respectively included in the input circuits of the vacuum tubes $V_2$, $V_3$ and $V_4$ having a common output circuit which is connected through the transformer $Y_2$ with the recorder $R_2$. The secondaries of transformers $T_2$, $T_3$ and $T_4$ respectively are included in the input circuits of the vacuum tubes $V_5$, $V_6$ and $V_7$ having a common output circuit which is connected through the transformer $Y_3$ with the recorder $R_3$. The secondaries of the transformers $T_3$, $T_4$ and $T_5$ are included respectively in the input circuits of the vacuum tubes $V_8$, $V_9$ and $V_{10}$ having a common output circuit which is connected through the transformer $Y_4$ with the recorder $R_4$. The secondaries of the transformer $T_4$, $T_5$ and $T_6$ are included respectively in the input circuits of the vacuum tubes $V_{11}$, $V_{12}$ and $V_{13}$, having a common output circuit which is connected through the transformer $Y_5$ with the recorder $R_5$. The secondary of the transformer $T_6$ is included in the input circuit of the vacuum tube $V_{14}$, the output circuit of which is connected through the transformer $Y_6$ with the recorder $R_6$.

The detonation of a charge of explosive at the point A produces artificial seismic waves, some of which travel downwardly to the discontinuity B and are reflected to the detectors $S_1$, $S_2$, $S_3$, $S_4$, $S_5$ and $S_6$, along the paths $P_1$, $P_2$, $P_3$, $P_4$, $P_5$ and $P_6$ respectively while other waves travel directly from the shot point to the various detectors. The waves received by $S_1$ are translated into electrical impulses which are amplified by $A_1$ and impressed through the transformer $T_1$ on the input circuit of the vacuum tube $V_1$ which repeats the impulses to the recorder $R_1$. In a like manner, the waves received by the detectors $S_2$, $S_3$, $S_4$, $S_5$ and $S_6$ are translated into electrical impulses which are amplified and impressed on the recorders $R_2$, $R_3$, $R_4$, $R_5$ and $R_6$ respectively. In addition, the amplified impulses from the receivers $S_1$ and $S_3$ are impressed upon the recorder $R_2$; the amplified impulses from $S_2$ and $S_4$ are impressed upon the recorder $R_3$; and the amplified impulses from $S_3$ and $S_5$ are impressed upon the recorder $R_4$ while the amplified impulses from $S_4$ and $S_6$ are impressed upon the recorder $R_5$. Thus, while the records produced by the recorders $R_1$ and $R_6$ are records only of the waves received respectively by the detectors $S_1$ and $S_6$, the records produced by the recorders $R_2$, $R_3$, $R_4$ and $R_5$ inclusive are composite records of waves received by three different detectors. The records produced by the recorders $R_1$ and $R_2$ are useful since they allow of a direct comparison between records made from a single detector and composite records made by the other recorders from a plurality of detectors.

According to this invention, there may be obtained as many records as there are detectors and of these records one or more are composite records. As the detectors are differently spaced from the shot point the direct waves are received out of phase and tend to cancel each other, the same being true of local random disturbances. The reflected waves, on the other hand, arrive at the wave detectors nearly in phase and will produce an additive effect in the composite record, thus facilitating determination of the instant of arrival of the reflected waves. In the particular arrangement specifically described above, four composite records, each resulting from the combination of impulses from three detectors are obtained by the use of six detectors and six recorders, while the former procedure would have required the use of twelve detectors and four recorders or one recorder and three detectors for each record. Thus, there is a net decrease of four instruments required to obtain the four composite records, and in addition, the present method yields two additional records showing the response of a single detector without requiring any additional apparatus.

The present method has an additional great advantage over those heretofore suggested because it allows the amplified outputs of the several detectors to be individually adjusted before combining them to form the composite records. To obtain the best results the amplified output of each detector should be adjusted to the same value. By turning off the filament current in tubes $V_2$, $V_4$, $V_5$, $V_7$, $V_8$, $V_{10}$, $V_{11}$, and $V_{13}$ each detector will actuate only one recorder. A test shot may then be made to observe the amplitudes of the records produced by each detector and the appropriate amount of amplification for each detector be selected. After this adjustment is made the filament current in the tubes $V_2$, $V_4$, $V_5$, $V_7$, $V_8$, $V_{10}$, $V_{11}$, may be turned on and the composite records made with the assurance that the several detectors are contributing equally to the combined record. The recorders $R_1$ to $R_6$ are not necessarily separate and distinct apparatus units, but may constitute different channels of a multiple recorder such as is well-known.

It is to be understood that the invention contemplates the use of any form of wave detector which will translate the artificial seismic waves into electrical impulses and that in the claims the term "detector" as used is descriptive of all such devices. Furthermore, it is to be understood that various modifications may be made without in any way departing from the spirit of the invention as defined in the appended claims. For example, the outputs of two or four of the detectors may be combined together or a different number of recorders may be used to produce the composite record. This invention also contemplates the use of a larger number of detectors than recorders connected together in such way as to produce a plurality of composite records, together with single detector records.

I claim:

1. The method of exploring geological formations which comprises producing a source of artificial seismic waves, receiving said waves by detectors arranged at progressively greater distances from the wave source and impressing the output of each detector upon a plurality of recorders, one or more of said recorders being arranged to record the combined output of several detectors.

2. The method of exploring geological formations which comprises producing a soure of artificial seismic waves, receiving said waves by detectors arranged at progressively greater distances from the wave source, impressing the output of each detector on different selected pairs of a group of recorders at least equal in number to said detectors with each recorder of the group having the output of one or more detectors impressed thereon and additionally impressing the output of one or more of said detectors on one or more of said recorders.

3. The method of exploring geological formations which comprises producing a source of artificial seismic waves, receiving said waves by detectors arranged at progressively greater distances from the wave source and connecting a like number of recorders to said detectors with each recorder connected to one detector and one or more recorders additionally connected to more than one detector.

4. The method of exploring geological formations which comprises producing a source of artificial seismic waves, receiving said waves by detectors arranged at progressively greater distances from the wave source, and connecting a like number of recorders to said detectors with each detector connected to a pair of recorders and one or more detectors additionally connected to more than two recorders.

5. Apparatus for use in exploring geological formations with artificial seismic waves comprising a plurality of wave detectors, an equal number of recorders, means connecting each detector to a given number of recorders and means connecting one or more of the recorders to a plurality of detectors.

6. Apparatus for use in exploring geological formations with artificial seismic waves comprising a plurality of wave detectors, an equal number of recorders, means connecting each detector to a pair of recorders and each recorder to a different detector, and means additionally connecting one or more of said detectors to more than two recorders.

7. Apparatus for use in exploring geological formations with artificial seismic waves comprising a plurality of wave detectors, an equal number of recorders, means connecting each detector to a given number of recorders, and means connecting one or more of said recorders to a plurality of said detectors.

8. The method of exploring sub-surface geological formations which comprises creating near the surface of the earth a center of disturbance from which seismic waves are propagated, placing a plurality of seismometers at points removed from said center of disturbance, connecting the seismometers to a plurality of recording devices in such a manner that at least some of said seismometers actuate a plurality of said recording devices and at least some of said recording devices are actuated by a plurality of said seismometers, whereby the characteristics of the records caused by reflected waves vary gradually from record to record due to the overlapping of the seismometers, thereby permitting the accurate identification and mensuration of the records caused by the reflected waves.

9. The method of exploring sub-surface geological formations which comprises creating near the surface of the earth a center of disturbance from which seismic waves are propagated, placing a plurality of seismometers at points removed from said center of disturbance, electrically connecting one of said seismometers to a recording device, electrically connecting a second of said seismometers to a second recording device and electrically connecting a third of said seismometers to both of said recording devices, whereby the records from said recording devices both partake of the characteristics which represent the seismic waves received by said last-mentioned seismometer.

10. The method of exploring sub-surface geological formations which comprises creating near the surface of the earth a center of disturbance from which seismic waves are propagated, placing a plurality of seismometers at points removed from the center of disturbance and dividing the output from each seismometer between or amongst a plurality of recording devices, whereby the records from each of said recording devices partakes of the characteristics which represent the algebraic sum of the outputs from a group of adjacent seismometers.

11. The method of exploring sub-surface geological formations which comprises creating near the surface of the earth a center of disturbance from which seismic waves are propagated, placing a plurality of seismometers at points removed from said center of disturbance, one of said seismometers being electrically connected to a recording device through a unilateral conductivity device, a second of said seismometers being electrically connected to a second recording device through a unilateral conductivity device and a third of said seismometers being electrically connected to both of said recording devices through unilateral conductivity devices, and utilizing said recording devices to record the effects of seismic waves propagated by said center of disturbance and received by said seismometers, whereby the records from said recording devices both partake of the characteristics which represent the seismic waves received by said last-mentioned seismometer, and whereby cross-feed is prevented.

12. The method of locating and measuring a sub-surface geological formation which comprises creating near the surface of the earth a center of disturbance from which seismic waves are propagated, placing a plurality of seismometers in contact with the earth at points removed from said center of disturbance, said seismometers being adapted to produce electric currents varying in accordance with variations in seismic waves received by them, one of said seismometers being electrically connected to a recording device through a unilateral conductivity device, a second of said seismometers being electrically connected to a second recording device through a unilateral conductivity device and a third of said seismometers being electrically connected to both of said recording devices through unilateral conductivity devices, and utilizing said recording devices to record the effect of seismic waves propagated by said center of disturbance, reflected from said sub-surface geological formation and received by said seismometers, whereby the characteristics of the records caused by said reflected waves vary gradually from record to record due to the overlapping of the seismometers and whereby cross-feed is prevented, thus permitting the accurate identification and mensuration of the records caused by said reflected waves.

13. Apparatus for use in exploring geological formations with artificial seismic waves comprising a plurality of wave detectors, a plurality of recorders, and operating connections between at least some of said detectors and a plurality of said recorders and between at least some of said recorders and a plurality of said detectors.

14. Apparatus for use in exploring geological formations with artificial seismic waves comprising a plurality of wave detectors, a plurality of recorders, and operating connections between a first detector and a first recorder, between a second detector and a second recorder and between a third detector and both said recorders.

15. Apparatus for recording seismic waves comprising a plurality of seismometers, a plurality of recording devices, electrical means for actuating certain of said recording instruments by a plurality of said seismometers and for causing certain of said seismometers to actuate a plurality of said recording devices, and means for preventing electrical coupling between the circuits actuating said recording devices.

16. Apparatus for recording seismic waves comprising a plurality of seismometers, a plurality of recording devices, electrical means for actuating a first recording device by a first seismometer, a second recording device by a second seismometer and both said recording devices by a third seismometer, and means for preventing electrical coupling between the circuits actuating said recording devices.

17. In an apparatus for detecting and recording the effects of artificial seismic waves reflected from a sub-surface geological formation, three seismometers adapted to produce varying electrical current, the variations in said electric currents corresponding to the seismic waves received by said seismometers, two recording devices, electrical connections between the first of said seismometers and the grid circuit of a first vacuum tube, electrical connections between the plate circuit of said first vacuum tube and a circuit controlling the first of said recording devices, electrical connections between the second of said seismometers and the grid circuits of both a second and a third vacuum tube, electrical connections between the plate circuit of said vacuum tube and a circuit actuating the first of said recording devices, electrical connections between the plate circuit of said third vacuum tube and a circuit actuating the second of said recording devices, electrical connection between the third of said seismometers and the grid circuit of a fourth vacuum tube and electrical connections between the plate circuit of said fourth vacuum tube and a circuit actuating the second of said recording devices, whereby the first of said recording devices is actuated by both the first and the second of said seismometers and the second of said recording devices is actuated by both the second and third of said seismometers and whereby electrical coupling between the various seismometer circuits is prevented.

18. Apparatus for recording reflected seismic waves comprising a plurality of progressively spaced seismometers, said seismometers constituting a plurality of progressively overlapping groups of adjacent seismometers, each of said groups containing at least one but less than all the seismometers of an adjacent group, a separate recording device corresponding to each of said groups of seismometers and means for actuating each recording device jointly by the seismometers of the group corresponding to said recording device.

19. Apparatus for exploring sub-surface geological formations which comprises three seismometers and two recording devices, means for actuating the first of said recording devices by one of said seismometers, means for actuating the second of said recording devices by another of said seismometers which does not actuate the first of said recording devices, and means for actuating both of said recording devices by the third of said seismometers.

20. Apparatus for exploring sub-surface geological formations which comprises three spaced seismometers and two recording devices, means for actuating the first of said recording devices by one of said seismometers, means for actuating the second of said recording devices by another of said seismometers which does not actuate the first of said recording devices, and means for actuating both of said recording devices by the third of said seismometers, said last-mentioned seismometer being located intermediate the other two of said three spaced seismometers.

21. The method of locating and measuring a subsurface geological formation which comprises creating near the surface of the earth a center of disturbance from which seismic waves are propagated, placing three seismometers adapted to produce varying electric currents, the variations in said electric currents corresponding to seismic waves received by said seismometers, in contact with the earth at three spaced points removed from but relatively near to said center of disturbance, the first of said seismometers being electrically connected to the grid circuit of a first vacuum tube, the second of said seismometers being electrically connected to the grid circuits of a second and a third vacuum tube, the third of said seismometers being electrically connected to the grid circuit of a fourth vacuum tube, operating a first recording device in response to current fluctuations in the plate circuit of said first vacuum tube, operating a second recording device in response to current fluctuation in the plate circuits of said second and third vacuum tubes, and operating a third recording device in response to current fluctuations in the plate circuit of said fourth vacuum tube, thereby utilizing said recording devices to record the effects of seismic waves propagated by said center of disturbance, reflected from said sub-surface geological formation and received by said seismometers, whereby the characteristics of the records caused by said reflected waves vary gradually from record to record due to the overlapping of the seismometers and whereby cross-feed is prevented, thus permitting the accurate identification and mensuration of the records caused by said reflected waves.

22. Apparatus for detecting and recording the effects of artificial seismic waves reflected from a sub-surface geological formation comprising three seismometers adapted to produce varying electric currents, the variations in said electric currents corresponding to seismic waves received by said seismometers, two recording devices, electrical connections between the first of said seismometers and the grid circuit of a first vacuum tube, electrical connections between the plate circuit of said first vacuum tube and a circuit controlling the first of said recording devices, electrical connections between the second of said seismometers and the grid circuits of both a second and a third vacuum tube, electrical connections between the plate circuit of said second vacuum tube and a circuit actuating the first of said recording devices, electrical connections between the plate circuit of said third vacuum tube and a circuit actuating the second of said recording devices, electrical connections between the third of said seismometers and the grid circuit of a fourth vacuum tube and electrical connections between the plate circuit of said fourth vacuum tube and a circuit actuating the second of said recording devices, whereby the first of said recording devices is actuated by both the first and the second of said seismometers and the second of said recording devices is actuated by both the second and the third of said seismometers and whereby cross-feed between the various circuits is prevented.

23. Apparatus for recording reflected seismic waves, comprising a plurality of progressively spaced seismometers, said seismometers constituting a plurality of progressively overlapping groups of adjacent seismometers, each of said groups containing at least one but less than all the seismometers of an adjacent group, a separate recording device corresponding to each of said groups of seismometers, and means, including unilateral conductivity devices, for actuating each recording device by the seismometers of the group corresponding to said recording device and for preventing cross-feed between the circuits actuating said recording devices.

WILLARD NORTH.